US012571401B2

(12) United States Patent
Yonemura et al.

(10) Patent No.: US 12,571,401 B2
(45) Date of Patent: Mar. 10, 2026

(54) CENTRIFUGAL COMPRESSOR

(71) Applicant: IHI Corporation, Tokyo (JP)

(72) Inventors: Atsushi Yonemura, Tokyo (JP); Yudai Kaneko, Tokyo (JP)

(73) Assignee: IHI Corporation, Tokyo (JP)

( * ) Notice: Subject to any disclaimer, the term of this patent is extended or adjusted under 35 U.S.C. 154(b) by 0 days.

(21) Appl. No.: 19/010,262

(22) Filed: Jan. 6, 2025

(65) Prior Publication Data

US 2025/0129791 A1 Apr. 24, 2025

Related U.S. Application Data

(63) Continuation of application No. PCT/JP2023/014077, filed on Apr. 5, 2023.

(30) Foreign Application Priority Data

Sep. 8, 2022 (JP) ................................ 2022-143038

(51) Int. Cl.
*F04D 27/02* (2006.01)
*F02B 37/12* (2006.01)
(Continued)

(52) U.S. Cl.
CPC .......... *F04D 27/0253* (2013.01); *F02B 37/12* (2013.01); *F04D 17/10* (2013.01); *F04D 29/464* (2013.01)

(58) Field of Classification Search
CPC .... F04D 29/685; F04D 29/464; F04D 29/667; F04D 29/462; F04D 29/4213;
(Continued)

(56) References Cited

U.S. PATENT DOCUMENTS 4,122,668 A * 10/1978 Chou .................... F01D 21/006
188/290
10,495,100 B2 * 12/2019 Mohtar ................. F04D 29/083
(Continued)

FOREIGN PATENT DOCUMENTS

CN 111148901 B 12/2021
EP 3 530 954 A1 8/2019
(Continued)

OTHER PUBLICATIONS

International Search Report issued Jun. 20, 2023 in PCT/JP2023/014077 filed Apr. 5, 2023, 2 pages.

*Primary Examiner* — Courtney D Heinle
*Assistant Examiner* — Behnoush Haghighian
(74) *Attorney, Agent, or Firm* — Oblon, McClelland, Maier & Neustadt, L.L.P.

(57) ABSTRACT

A centrifugal compressor includes: an intake flow path connected to an intake port; a compressor impeller disposed in the intake flow path; a movable member provided on the intake port side with respect to the compressor impeller in the intake flow path, the movable member movable to a protruding position protruding into the intake flow path and a retracted position retracting from the intake flow path; a first end that is an end, on the compressor impeller side, of an inner curved surface of the movable member; a second end that is an end, on the intake port side, of the inner curved surface of the movable member; and an extending portion between the first end and the second end, the extending portion extending in a direction corresponding to a rotation axis direction of the compressor impeller.

12 Claims, 10 Drawing Sheets

(51) Int. Cl.
*F04D 17/10* (2006.01)
*F04D 29/46* (2006.01)

(58) Field of Classification Search
CPC .. F04D 29/444; F04D 27/002; F04D 27/0207; F04D 27/0215; F04D 27/0246; F04D 27/0253; F04D 27/023; F04D 27/0238; F01D 17/141; F01D 17/145; F01D 17/146
See application file for complete search history.

(56) References Cited

U.S. PATENT DOCUMENTS

| | | | | |
|---|---|---|---|---|
| 10,502,232 | B2 * | 12/2019 | Mohtar | F04D 29/462 |
| 10,544,808 | B2 * | 1/2020 | Mohtar | F16K 3/03 |
| 10,550,761 | B2 * | 2/2020 | Lombard | F04D 29/4206 |
| 10,619,561 | B2 * | 4/2020 | Lombard | F04D 29/4213 |
| 11,105,218 | B2 * | 8/2021 | Karstadt | F02B 37/225 |
| 11,460,047 | B2 * | 10/2022 | Sakisaka | F04D 17/10 |
| 11,591,926 | B2 * | 2/2023 | Stankevicius | F01D 25/24 |
| 11,754,093 | B2 * | 9/2023 | Sakisaka | F04D 29/464 415/164 |
| 11,946,480 | B2 * | 4/2024 | Yonemura | F04D 27/0253 |
| 2019/0136755 | A1 * | 5/2019 | Lombard | F04D 29/4213 |
| 2019/0162200 | A1 * | 5/2019 | Mohtar | F04D 29/4213 |
| 2019/0264604 | A1 * | 8/2019 | Lombard | F04D 29/464 |
| 2019/0264710 | A1 * | 8/2019 | Mohtar | F04D 29/464 |
| 2019/0271329 | A1 * | 9/2019 | Mohtar | F04D 29/462 |
| 2020/0011196 | A1 * | 1/2020 | Karstadt | F16K 3/03 |
| 2020/0208652 | A1 * | 7/2020 | Bogner | F02B 33/40 |
| 2020/0309141 | A1 * | 10/2020 | Vuletic | F04D 29/464 |
| 2021/0088054 | A1 * | 3/2021 | Sakisaka | F02B 33/40 |
| 2022/0090514 | A1 * | 3/2022 | Stankevicius | F01D 17/145 |
| 2022/0120289 | A1 * | 4/2022 | Sakisaka | F04D 29/46 |
| 2022/0307510 | A1 * | 9/2022 | Yonemura | F04D 29/462 |

FOREIGN PATENT DOCUMENTS

| | | | |
|---|---|---|---|
| JP | 2016-173051 | A | 9/2016 |
| WO | WO 2020/031507 | A1 | 2/2020 |

* cited by examiner

CENTRIFUGAL COMPRESSOR

CROSS REFERENCE TO RELATED APPLICATIONS

This application is a continuation application of International Application No. PCT/JP2023/014077, filed on Apr. 5, 2023, which claims priority to Japanese Patent Application No. 2022-143038, filed on Sep. 8, 2022, the entire contents of which are incorporated by reference herein.

BACKGROUND ART

Technical Field

The present disclosure relates to centrifugal compressors. The present application claims the benefit of priority based on Japanese Patent Application No. 2022-143038 filed on Sep. 8, 2022, the content of which is incorporated herein.

Related Art

A centrifugal compressor includes a compressor housing in which an intake flow path is formed. A compressor impeller is disposed in the intake flow path. When the flow rate of the air flowing into the compressor impeller decreases, the air compressed by the compressor impeller flows backward through the intake flow path, and a phenomenon called surging occurs.

Patent Literature 1 discloses a centrifugal compressor in which a throttle mechanism is included in a compressor housing. The throttle mechanism is disposed on the upstream side of intake air with respect to the compressor impeller. The throttle mechanism includes a movable member. The movable member is movable to a protruding position protruding into the intake flow path and a retracted position retracting from the intake flow path. The throttle mechanism reduces the cross-sectional area of the intake flow path by causing the movable member to protrude into the intake flow path. When the movable member protrudes into the intake flow path, the air flowing backward in the intake flow path is blocked by the movable member. With the air flowing backward in the intake flow path blocked, surging is suppressed.

CITATION LIST

Patent Literature

Patent Literature 1: European Patent Application Publication No. 3530954

SUMMARY

Technical Problem

In a centrifugal compressor including a movable member for suppressing surging, in a case where strong backflow of air occurs in an intake flow path, the backflow of air may not be sufficiently blocked by the movable member. In this case, the efficiency of the centrifugal compressor decreases.

An object of the present disclosure is to provide a centrifugal compressor capable of suppressing a decrease in efficiency of the centrifugal compressor.

Solution to Problem

In order to solve the above problems, a centrifugal compressor of the present disclosure includes: an intake flow path connected to an intake port; a compressor impeller disposed in the intake flow path; a movable member provided on the intake port side with respect to the compressor impeller in the intake flow path, the movable member movable to a protruding position protruding into the intake flow path and a retracted position retracting from the intake flow path; a first end that is an end, on the compressor impeller side, of an inner curved surface of the movable member; a second end that is an end, on the intake port side, of the inner curved surface of the movable member; and an extending portion between the first end and the second end, the extending portion extending in a direction corresponding to a rotation axis direction of the compressor impeller.

A curvature radius of the second end may be larger than a curvature radius of the first end.

The curvature radius of the second end may be larger than the thickness of the movable member in the rotation axis direction.

A fillet portion may be formed between the second end and a surface of the movable member facing the intake port side.

A radial distance between an inner circumferential edge of the surface of the movable member facing the intake port side and the extending portion may be less than or equal to 80% of a thickness of the movable member in the rotation axis direction.

A radial distance between an inner circumferential edge of the surface of the movable member facing the intake port side and the extending portion may be greater than or equal to 20% of the thickness of the movable member in the rotation axis direction.

Effects

According to the present disclosure, it is possible to suppress a decrease in efficiency of a centrifugal compressor.

DESCRIPTION OF EMBODIMENTS

Embodiments of the present disclosure will be described below by referring to the accompanying drawings. Dimensions, materials, other specific numerical values, and the like illustrated in the embodiments are merely an example for facilitating understanding, and the present disclosure is not limited thereto unless otherwise specified. Note that, in the present specification and the drawings, components having substantially the same function and structure are denoted by the same symbol, and redundant explanations are omitted. Illustration of components not directly related to the present disclosure is omitted.

Figure 1:
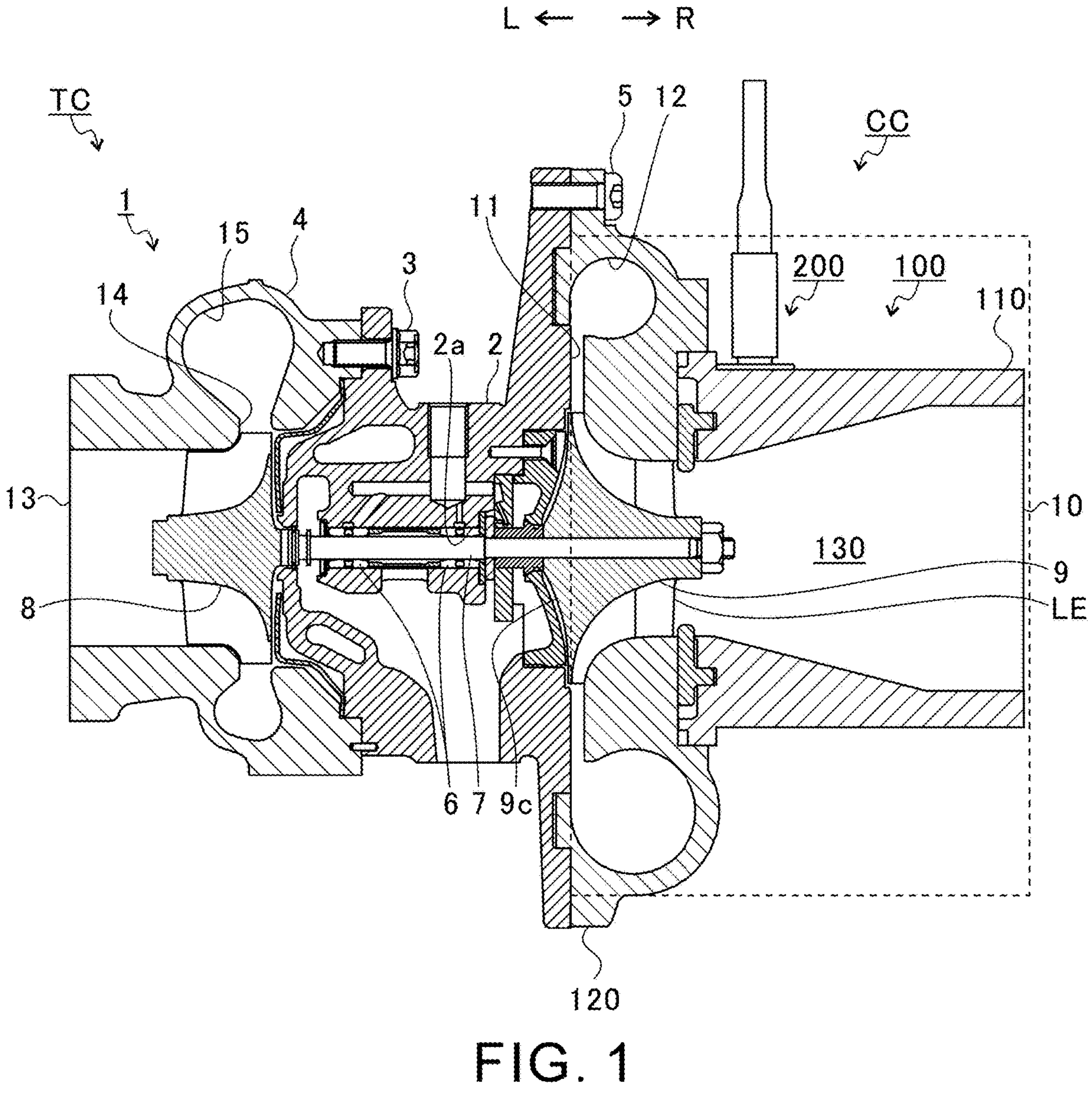
FIG. 1 is a schematic cross-sectional view illustrating a turbocharger according to an embodiment of the present disclosure.

FIG. 1 is a schematic cross-sectional view of a turbocharger TC. Description is given on the premise that an arrow L illustrated in FIG. 1 points to the left side of the turbocharger TC. Description is given on the premise that an arrow R illustrated in FIG. 1 points to the right side of the turbocharger TC. Of the turbocharger TC, a compressor housing 100 side described later functions as a centrifugal compressor CC. Hereinafter, description is given on the premise that the centrifugal compressor CC is driven by a turbine blade wheel 8 described later. However, the present invention is not limited to the above, and the centrifugal compressor CC may be driven by an engine (not illustrated) or may be driven by an electric motor (not illustrated). In this manner, the centrifugal compressor CC may be incorporated in a device other than the turbocharger TC or may be a separate device.

As illustrated in FIG. 1, the turbocharger TC includes a turbocharger main body 1. The turbocharger main body 1 includes a bearing housing 2, a turbine housing 4, a compressor housing 100, and a link mechanism 200. Details of the link mechanism 200 will be described later. The turbine housing 4 is connected to the left side of the bearing housing 2 by a fastening bolt 3. The compressor housing 100 is connected to the right side of the bearing housing 2 by a fastening bolt 5.

A receiving hole 2*a* is formed in the bearing housing 2. The receiving hole 2*a* penetrates through the turbocharger TC in the left-right direction. A bearing 6 is disposed in the receiving hole 2*a*. The bearing 6 is, for example, a full floating bearing. Incidentally, the bearings 6 may be another radial bearing such as a semi-floating bearing or a rolling bearing. A part of a shaft 7 is disposed in the receiving hole 2*a*. The shaft 7 is pivotally supported by the bearing 6 in a freely rotatable manner. At a left end of the shaft 7, the turbine blade wheel 8 is provided. The turbine blade wheel 8 is housed in the turbine housing 4 in a freely rotatable manner. At a right end of the shaft 7, a compressor impeller 9 is provided. The compressor impeller 9 is accommodated in the compressor housing 100 in a freely rotatable manner.

An intake port 10 is formed in the compressor housing 100. The intake port 10 opens to the right side of the turbocharger TC. The intake port 10 is connected to an air cleaner (not illustrated). A diffuser flow path 11 is formed between the bearing housing 2 and the compressor housing 100. The diffuser flow path 11 pressurizes the air. The diffuser flow path 11 is formed in an annular shape from the inner side to the outer side in the radial direction of the compressor impeller 9 (hereinafter, simply referred to as the radial direction). The diffuser flow path 11 communicates with the intake port 10 via the compressor impeller 9 on the inner side in the radial direction.

In addition, a compressor scroll flow path 12 is formed in the compressor housing 100. The compressor scroll flow path 12 is formed in an annular shape. The compressor scroll flow path 12 is positioned on the outer side in the radial direction with respect to the compressor impeller 9. The compressor scroll flow path 12 communicates with an intake port of the engine (not illustrated) and the diffuser flow path 11. When the compressor impeller 9 rotates, the air is sucked from the intake port 10 into the compressor housing 100. The sucked air is pressurized and accelerated in the process of flowing between blades of the compressor impeller 9. The pressurized and accelerated air is further pressurized by the diffuser flow path 11 and the compressor scroll flow path 12. The pressurized air flows out from a discharge port (not illustrated) and is guided to the intake port of the engine.

As described above, the turbocharger TC includes the centrifugal compressor CC. The centrifugal compressor CC includes the compressor housing 100, the compressor impeller 9, and the link mechanism 200 to be described later.

An exhaust port 13 is formed in the turbine housing 4. The exhaust port 13 opens to the left side of the turbocharger TC. The exhaust port 13 is connected to an exhaust gas purification device (not illustrated). A communication flow path 14 and a turbine scroll flow path 15 are formed in the turbine housing 4. The turbine scroll flow path 15 is positioned on the outer side in the radial direction with respect to the turbine blade wheel 8. A communication flow path 14 is positioned between the turbine blade wheel 8 and the turbine scroll flow path 15.

The turbine scroll flow path 15 communicates with a gas inlet port (not illustrated). Exhaust gas discharged from an exhaust manifold of the engine (not illustrated) is guided to the gas inlet port. The communication flow path 14 communicates the turbine scroll flow path 15 and the exhaust port 13. The exhaust gas guided from the gas inlet port to the turbine scroll flow path 15 is guided to the exhaust port 13 via the communication flow path 14 and spaces between blades of the turbine blade wheel 8. The exhaust gas rotates the turbine blade wheel 8 in the process of flowing therethrough.

The turning force of the turbine blade wheel 8 is transmitted to the compressor impeller 9 via the shaft 7. As described above, the turning force of the compressor impeller 9 causes the air to be pressurized and to be guided to the intake port of the engine.

Figure 2:
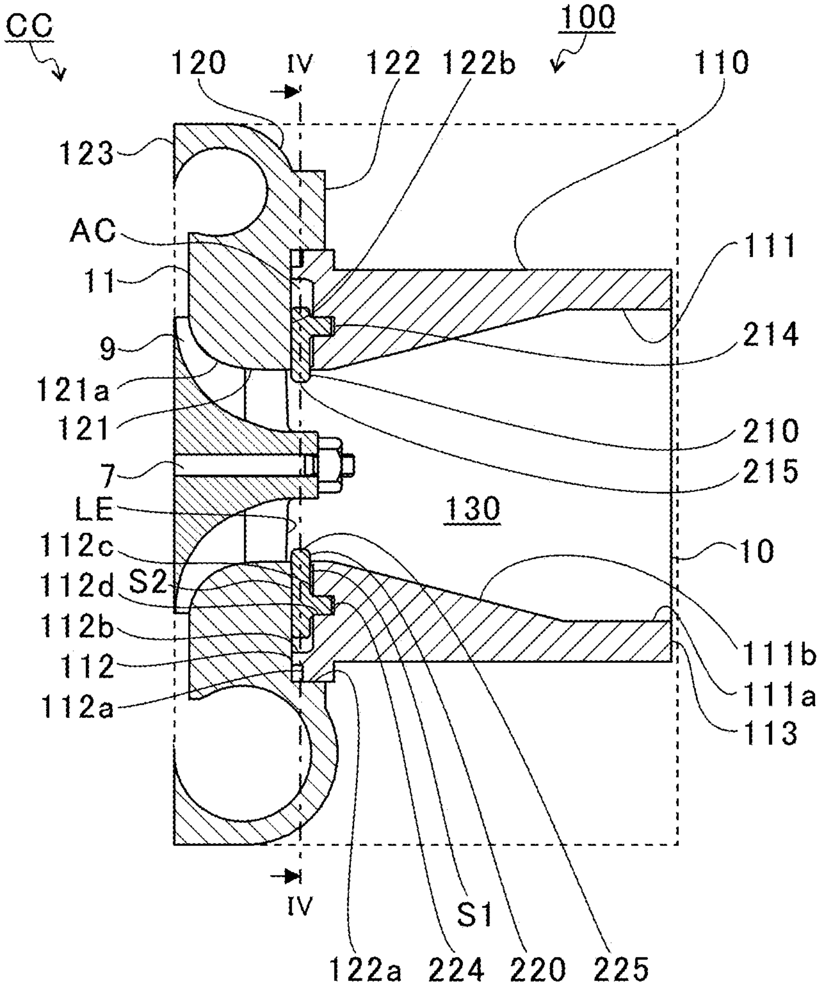
FIG. 2 is a diagram of a broken line part extracted from FIG. 1.

FIG. 2 is a diagram of a broken line part extracted from FIG. 1. As illustrated in FIGS. 1 and 2, the compressor housing 100 includes a first housing member 110 and a second housing member 120. The first housing member 110 is located on the right side of the second housing member 120 in FIG. 2. The second housing member 120 is connected to the bearing housing 2. The first housing member 110 is connected to the second housing member 120.

As illustrated in FIG. 2, the first housing member 110 has an approximately cylindrical shape. A through hole 111 is formed in the first housing member 110. The first housing member 110 has an end surface 112 on the side close to the second housing member 120. The first housing member 110 also has an end surface 113 on a side away from the second housing member 120. The intake port 10 is formed on the end surface 113. The through hole 111 extends from the end surface 112 to the end surface 113 along the rotation axis direction of the compressor impeller 9 (hereinafter, simply referred to as a rotation axis direction). That is, the through hole 111 penetrates the first housing member 110 in the rotation axis direction.

The through hole 111 has a parallel portion 111*a* and a reduced diameter portion 111*b*. The parallel portion 111*a* is located on the end surface 113 side with respect to the reduced diameter portion 111*b*. The inner diameter of the parallel portion 111*a* is approximately constant in the rotation axis direction. The reduced diameter portion 111*b* is located on the end surface 112 side with respect to the parallel portion 111*a*. The reduced diameter portion 111*b* is continuous with the parallel portion 111*a*. The inner diameter of a portion of the reduced diameter portion 111*b* that is continuous with the parallel portion 111*a* is approximately equal to the inner diameter of the parallel portion 111*a*. The inner diameter of the reduced diameter portion 111*b* decreases as it is away from the parallel portion 111*a*.

A cutout portion 112*a* is formed on the end surface 112. The cutout portion 112*a* is recessed from the end surface 112 toward the end surface 113 side. The cutout portion 112*a* is formed in an outer circumferential portion of the end surface 112. The cutout portion 112*a* has, for example, a substantially annular shape when viewed from the rotation axis direction.

Furthermore, an accommodation chamber AC is formed on the end surface 112. The accommodation chamber AC is formed in the first housing member 110 on the intake port 10 side with respect to a leading edge LE of blades of the compressor impeller 9. The accommodation chamber AC includes an accommodation groove 112*b* described later, a bearing hole 112*d*, and an accommodation hole 115 (see FIG. 3) to be described later.

The accommodation groove 112*b* is formed on the end surface 112. The accommodation groove 112*b* is positioned between the cutout portion 112*a* and the through hole 111. The accommodation groove 112*b* is recessed from the end surface 112 toward the end surface 113 side. The accommodation groove 112*b* has, for example, a substantially annular shape when viewed in the rotation axis direction. The accommodation groove 112*b* communicates with the through hole 111 on the radially inner side.

The bearing hole 112*d* is formed on a wall surface 112*c* of the accommodation groove 112*b* on the end surface 113 side. The bearing hole 112*d* extends in the rotation axis direction from the wall surface 112*c* toward the end surface 113 side. Two bearing holes 112*d* are formed separated from each other in the rotation direction of the compressor impeller 9 (hereinafter, simply referred to as the rotation direction or the circumferential direction). The two bearing holes 112*d* are arranged at positions shifted by 180 degrees in the rotation direction.

A through hole 121 is formed in the second housing member 120. The second housing member 120 has an end surface 122 on a side close to the first housing member 110. The second housing member 120 also has an end surface 123 on a side away from the first housing member 110. The through hole 121 extends from the end surface 122 to the end surface 123 along the rotation axis direction. That is, the through hole 121 penetrates the second housing member 120 in the rotation axis direction.

The inner diameter of an end of the through hole 121 on the end surface 122 side is approximately equal to the inner diameter of the end of the through hole 111 on the end surface 112 side. A shroud portion 121*a* is formed on an inner wall of the through hole 121. The shroud portion 121*a* faces the compressor impeller 9 from the outer side in the radial direction. The outer diameter of the compressor impeller 9 increases as it is farther from leading edges LE of the blades of the compressor impeller 9. The inner diameter of the shroud portion 121*a* increases as the shroud portion 121*a* is separated away from the end surface 122.

An accommodation groove 122*a* is formed on the end surface 122. The accommodation groove 122*a* is recessed from the end surface 122 toward the end surface 123 side. The accommodation groove 122*a* has, for example, a substantially annular shape when viewed in the rotation axis direction. The first housing member 110 is inserted into the accommodation groove 122*a*. The end surface 112 of the first housing member 110 abuts on a wall surface 122*b* of the accommodation groove 122*a* on the end surface 123 side. At this point, the accommodation chamber AC is formed between the first housing member 110 (specifically, the wall surface 112*c*) and the second housing member 120 (specifically, the wall surface 122*b*).

An intake flow path 130 is formed by the through hole 111 of the first housing member 110 and the through hole 121 of the second housing member 120. That is, the intake flow path 130 is formed in the compressor housing 100. The intake flow path 130 is connected to the intake port 10 on one side and is connected to the diffuser flow path 11 on the other side. The intake port 10 and the diffuser flow path 11 communicate with each other via the intake flow path 130. The intake port 10 side of the intake flow path 130 is defined as an upstream side of intake air, and the diffuser flow path 11 side of the intake flow path 130 is defined as a downstream side of intake air.

The compressor impeller 9 is disposed in the intake flow path 130. The cross-sectional shape of the intake flow path 130 orthogonal to the rotation axis direction is, for example, a circle centered on the rotation axis of the compressor impeller 9. However, the cross-sectional shape of the intake flow path 130 is not limited to a circle and may be, for example, an elliptical shape.

A sealing material (not illustrated) is disposed in the cutout portion 112*a* of the first housing member 110. The sealing material suppresses the flow rate of the air flowing through a gap between the first housing member 110 and the second housing member 120. However, the cutout portion 112*a* and the sealing material are not essential.

Figure 3:
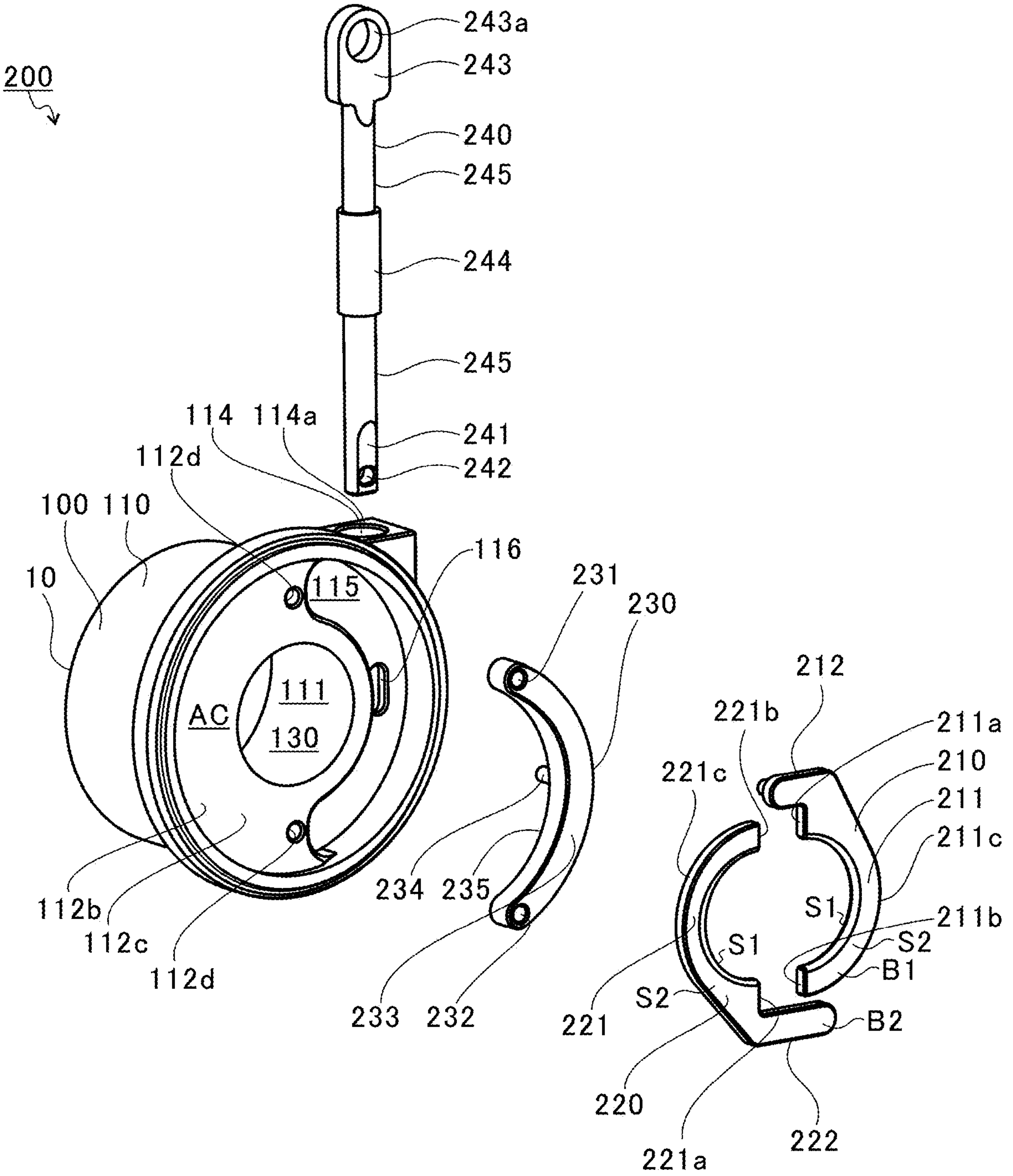
FIG. 3 is an exploded perspective view of members included in a link mechanism.

FIG. 3 is an exploded perspective view of members included in the link mechanism 200. In FIG. 3, only the first housing member 110 of the compressor housing 100 is illustrated. As illustrated in FIG. 3, the link mechanism 200 includes the first housing member 110, a first movable member 210, a second movable member 220, a coupling member 230, and a rod 240. The link mechanism 200 is disposed on the intake port 10 side (upstream side) with respect to the compressor impeller 9 in the intake flow path 130 in the rotation axis direction.

The first movable member 210 is disposed in the accommodation groove 112*b* (specifically, the accommodation chamber AC). Specifically, the first movable member 210 is disposed between the wall surface 112*c* of the accommodation groove 112*b* and the wall surface 122*b* (see FIG. 2) of the accommodation groove 122*a* in the rotation axis direction. The first movable member 210 is formed of, for example, a resin material. The first movable member 210 is molded by injection molding, for example.

The first movable member 210 has a facing surface S1 facing the wall surface 112*c* of the accommodation groove 112*b* and a facing surface S2 facing the wall surface 122*b* of the accommodation groove 122*a*. The first movable member 210 includes a main body B1. The main body B1 includes a curved portion 211 and an arm portion 212.

The curved portion 211 extends in the circumferential direction of the compressor impeller 9. The curved portion 211 has a substantially arc shape. One end surface 211*a* and another end surface 211*b* of the curved portion 211 in the circumferential direction extend in parallel to the radial direction and the rotation axis direction. However, the one end surface 211*a* and the other end surface 211*b* may be inclined with respect to the radial direction and the rotation axis direction.

The arm portion 212 is included on the one end surface 211*a* side of the curved portion 211. The arm portion 212 extends outward in the radial direction with respect to an outer curved surface 211*c* of the curved portion 211. Furthermore, the arm portion 212 extends in a direction inclined with respect to the radial direction (specifically, in a direction approaching the second movable member 220).

The second movable member 220 is disposed in the accommodation groove 112*b* (specifically, the accommodation chamber AC). Specifically, the second movable member 220 is disposed between the wall surface 112*c* of the accommodation groove 112*b* and the wall surface 122*b* (see FIG. 2) of the accommodation groove 122*a* in the rotation axis direction. The second movable member 220 is formed of, for example, a resin material. The second movable member 220 is molded by injection molding, for example.

The second movable member 220 has a facing surface S1 facing the wall surface 112*c* of the accommodation groove 112*b* and a facing surface S2 facing the wall surface 122*b* of the accommodation groove 122*a*. The second movable member 220 includes a main body B2. The main body B2 includes a curved portion 221 and an arm portion 222.

The curved portion 221 extends in the circumferential direction of the compressor impeller 9. The curved portion 221 has substantially an arc shape. One end surface 221*a* and another end surface 221*b* of the curved portion 221 in the circumferential direction extend in parallel to the radial direction and the rotation axis direction. Incidentally, the one end surface 221*a* and the other end surface 221*b* may be inclined with respect to the radial direction and the rotation axis direction.

The arm portion 222 is included on the one end surface 221*a* side of the curved portion 221. The arm portion 222 extends outward in the radial direction with respect to an outer curved surface 221*c* of the curved portion 221. Furthermore, the arm portion 222 extends in a direction inclined with respect to the radial direction (specifically, in a direction approaching the first movable member 210).

The curved portion 211 and the curved portion 221 face each other with the rotation center of the compressor impeller 9 interposed therebetween. That is, the curved portion 211 faces the curved portion 221 with the intake flow path 130 interposed therebetween. The one end surface 211*a* of the curved portion 211 and the other end surface 221*b* of the curved portion 221 face each other in the circumferential direction. The other end surface 211*b* of the curved portion 211 and the one end surface 221*a* of the curved portion 221 face each other in the circumferential direction. In the first movable member 210 and the second movable member 220, as will be described in detail later, the curved portions 211 and 221 are movable in the radial direction.

The coupling member 230 is coupled to the first movable member 210 and the second movable member 220. The coupling member 230 is positioned on the intake port 10 side with respect to the first movable member 210 and the second movable member 220. The coupling member 230 has substantially an arc shape. In the coupling member 230, a first bearing hole 231 is formed on one end side in the circumferential direction, and a second bearing hole 232 is formed on the other end side. The first bearing hole 231 and the second bearing hole 232 are open on an end surface 233 of the coupling member 230 on the side of the first movable member 210 and the second movable member 220. The first bearing hole 231 and the second bearing hole 232 extend in the rotation axis direction. In this example, the first bearing hole 231 and the second bearing hole 232 do not penetrate through. However, the first bearing hole 231 and the second bearing hole 232 may penetrate through the coupling member 230 in the rotation axis direction.

A rod connection portion 234 is formed between the first bearing hole 231 and the second bearing hole 232 in the coupling member 230. The rod connection portion 234 is formed on an end surface 235 of the coupling member 230 on the side opposite to the first movable member 210 and the second movable member 220. The rod connection portion 234 projects from the end surface 235 in the rotation axis direction. The rod connection portion 234 has, for example, a substantially cylindrical shape.

The rod 240 has a substantially cylindrical shape. A planar portion 241 is formed at one end of the rod 240, and a coupling portion 243 is formed at the other end of the rod 240. The planar portion 241 extends in a planar direction substantially orthogonal to the rotation axis direction. A bearing hole 242 opens in the planar portion 241. The bearing hole 242 extends in the rotation axis direction. The coupling portion 243 includes a coupling hole 243*a*. An actuator 250 (see FIGS. 5 to 7) to be described later is coupled to the coupling portion 243 (specifically, the coupling hole 243*a*). The bearing hole 242 may be, for example, a lateral hole whose length in a direction orthogonal to the rotation axis direction and the axial direction of the rod 240 is longer that the length in the axial direction of the rod 240.

In the rod 240, a rod large-diameter portion 244 and two rod small-diameter portions 245 are formed between the planar portion 241 and the coupling portion 243. The rod large-diameter portion 244 is disposed between the two rod small-diameter portions 245. Of the two rod small-diameter portions 245, the rod small-diameter portion 245 on the planar portion 241 side connects the rod large-diameter portion 244 and the planar portion 241. Of the two rod small-diameter portions 245, the rod small-diameter portion 245 on the coupling portion 243 side connects the rod large-diameter portion 244 and the coupling portion 243. The outer diameter of the rod large-diameter portion 244 is larger than the outer diameters of the two rod small-diameter portions 245.

An insertion hole 114 is formed in the first housing member 110. One end 114*a* of the insertion hole 114 opens to the outside of the first housing member 110. The insertion hole 114 extends, for example, in a planar direction orthogonal to the rotation axis direction. The insertion hole 114 is positioned on the outer side in the radial direction with respect to the through hole 111. The insertion hole 114 is positioned on the outer side in the radial direction with respect to the intake flow path 130. The planar portion 241 side of the rod 240 is inserted into the insertion hole 114. The rod large-diameter portion 244 is guided by an inner wall surface of the insertion hole 114. The movement of the rod 240 in a direction other than the central axis direction of the insertion hole 114 is restricted.

An accommodation hole 115 is formed in the first housing member 110. The accommodation hole 115 opens to the wall surface 112*c* of the accommodation groove 112*b*. The accommodation hole 115 is recessed from the wall surface 112*c* toward the intake port 10. The accommodation hole 115 is positioned on a side away from the intake port 10 with respect to the insertion hole 114. The accommodation hole 115 has a substantially arc shape when viewed from the rotation axis direction. The accommodation hole 115 extends longer in the circumferential direction than the coupling member 230. The accommodation hole 115 is spaced apart from the bearing hole 112*d* in the circumferential direction.

A communication hole 116 is formed in the first housing member 110. The communication hole 116 communicates the insertion hole 114 and the accommodation hole 115. The communication hole 116 is formed in the accommodation hole 115 in an approximately middle portion in the circumferential direction. The communication hole 116 is, for example, an elliptical hole extending approximately in parallel to the extending direction of the insertion hole 114. The width of the communication hole 116 in the longitudinal direction (specifically, in the extending direction) is wider than the width of the communication hole 116 in the lateral direction (specifically, a direction orthogonal to the extending direction). The width of the communication hole 116 in the lateral direction is larger than the outer diameter of the rod connection portion 234 of the coupling member 230.

The coupling member 230 is accommodated in the accommodation hole 115. In this manner, the first movable member 210, the second movable member 220, and the coupling member 230 are arranged in the accommodation chamber AC formed in the first housing member 110. The circumferential length of the accommodation hole 115 is longer than the circumferential length of the coupling member 230. The radial width of the accommodation hole 115 is also wider than the radial width of the coupling member 230. Therefore, the movement of the coupling member 230 in a planar direction orthogonal to the rotation axis direction is allowed inside the accommodation hole 115.

The rod connection portion 234 is inserted from the communication hole 116 into the insertion hole 114. The planar portion 241 of the rod 240 is inserted into the insertion hole 114. The bearing hole 242 of the planar portion 241 faces the communication hole 116. The rod connection portion 234 is inserted into the bearing hole 242 for connection. The rod connection portion 234 is pivotally supported by the bearing hole 242.

Figure 4:
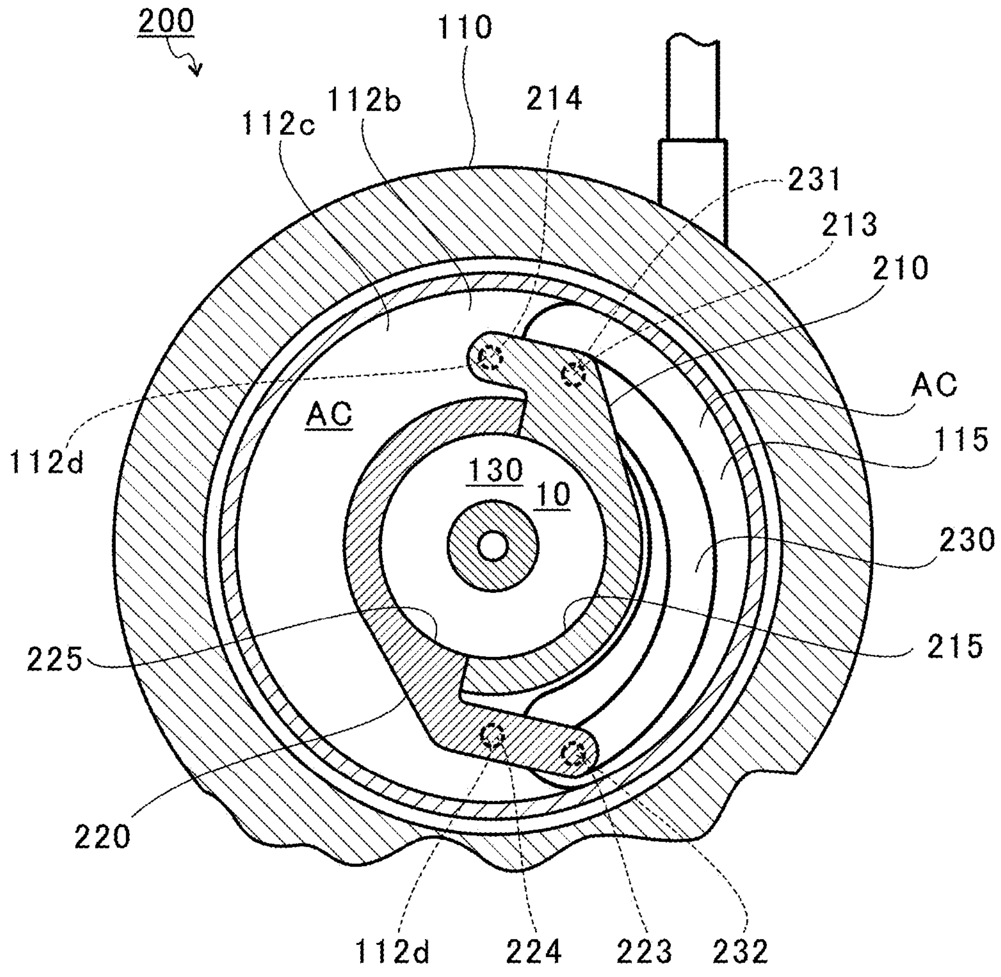
FIG. 4 is a cross-sectional view taken along line IV-IV in FIG. 2.

FIG. 4 is a cross-sectional view taken along line IV-IV in FIG. 2. As illustrated by broken lines in FIG. 4, the first movable member 210 includes a coupling shaft 213 and a rotation shaft 214. The coupling shaft 213 and the rotation shaft 214 protrude in the rotation axis direction from the facing surface S1 (see FIG. 2) of the first movable member 210 facing the wall surface 112*c*. The coupling shaft 213 and the rotation shaft 214 extend toward the back side of the paper in FIG. 4. The rotation shaft 214 extends in parallel to the coupling shaft 213. The coupling shaft 213 and the rotation shaft 214 have an approximately cylindrical shape.

The outer diameter of the coupling shaft 213 is smaller than the inner diameter of the first bearing hole 231 of the coupling member 230. The coupling shaft 213 is inserted into the first bearing hole 231. The coupling shaft 213 is pivotally supported by the first bearing hole 231 in a freely rotatable manner. The outer diameter of the rotation shaft 214 is smaller than the inner diameter of the bearing hole 112*d* of the first housing member 110. The rotation shaft 214 is inserted into the bearing hole 112*d* on the vertically upper side (namely, the side close to the rod 240) of the two bearing holes 112*d*. The rotation shaft 214 is pivotally supported by the bearing hole 112*d* in a freely rotatable manner.

The second movable member 220 includes a coupling shaft 223 and a rotation shaft 224. The coupling shaft 223 and the rotation shaft 224 protrude in the rotation axis direction from the facing surface S1 (see FIG. 2) of the second movable member 220 facing the wall surface 112*c*. The coupling shaft 223 and the rotation shaft 224 extend toward the back side of the paper in FIG. 4. The rotation shaft 224 extends in parallel to the coupling shaft 223. The coupling shaft 223 and the rotation shaft 224 have an approximately cylindrical shape.

The outer diameter of the coupling shaft 223 is smaller than the inner diameter of the second bearing hole 232 of the coupling member 230. The coupling shaft 223 is inserted into the second bearing hole 232. The coupling shaft 223 is pivotally supported by the second bearing hole 232 in a freely rotatable manner. The outer diameter of the rotation shaft 224 is smaller than the inner diameter of the bearing hole 112*d* of the first housing member 110. The rotation shaft 224 is inserted into the bearing hole 112*d* on the vertically lower side (namely, the side separated away from the rod 240) of the two bearing holes 112*d*. The rotation shaft 224 is pivotally supported by the bearing hole 112*d* in a freely rotatable manner.

As described above, the link mechanism 200 has four links. The four links are the first movable member 210, the second movable member 220, the first housing member 110, and the coupling member 230. Since the link mechanism 200 has four links, the link mechanism 200 has a limited chain, which gives one-degree-of-freedom, thereby making it easy to control.

Figure 5:
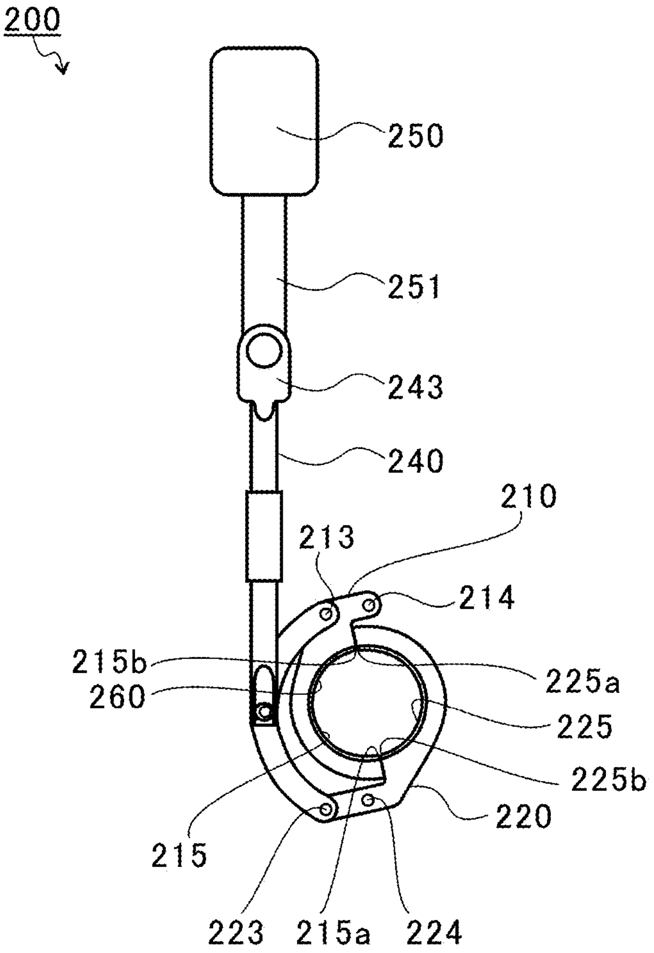
FIG. 5 is a first diagram for explaining the operation of the link mechanism.

FIG. 5 is a first diagram for explaining the operation of the link mechanism 200. In the following FIGS. 5, 6, and 7, diagrams of the link mechanism 200 as viewed from the intake port 10 side are illustrated. As illustrated in FIG. 5, one end of a driving shaft 251 of an actuator 250 is coupled to the coupling portion 243 of the rod 240.

The actuator 250 is an electric actuator and is driven by electricity. The actuator 250 is, for example, an electric cylinder having a motor (not illustrated). In this case, the rotational power of the motor is converted into power in a linear traveling direction and transmitted to the driving shaft 251. As a result, the driving shaft 251 moves in the axial direction. When the rotation direction of the motor is switched, the moving direction of the driving shaft 251 is switched.

In the arrangement illustrated in FIG. 5, the first movable member 210 and the second movable member 220 are in contact with each other. In this example, as illustrated in FIGS. 2 and 4, a protruding portion 215, which is a portion of the first movable member 210 on an inner side in the radial direction, protrudes into the intake flow path 130. A protruding portion 225, which is a portion of the second movable member 220 on an inner side in the radial direction, protrudes into the intake flow path 130. The position of the first movable member 210 and the second movable member 220 in this state (specifically, the state illustrated in FIG. 5) is referred to as a protruding position. At the protruding position, the first movable member 210 and the second movable member 220 protrude into the intake flow path 130.

As illustrated in FIG. 5, at the protruding position, ends 215*a* and 215*b* of the protruding portion 215 in the circumferential direction and ends 225*a* and 225*b* of the protruding portion 225 in the circumferential direction abut on each other. The protruding portions 215 and 225 form an annular hole 260. The inner diameter of the annular hole 260 is smaller than the inner diameter of the intake flow path 130 at a position where the protruding portions 215 and 225 protrude. The inner diameter of the annular hole 260 is, for example, smaller than the inner diameter of the intake flow path 130 at any position.

Figure 6:
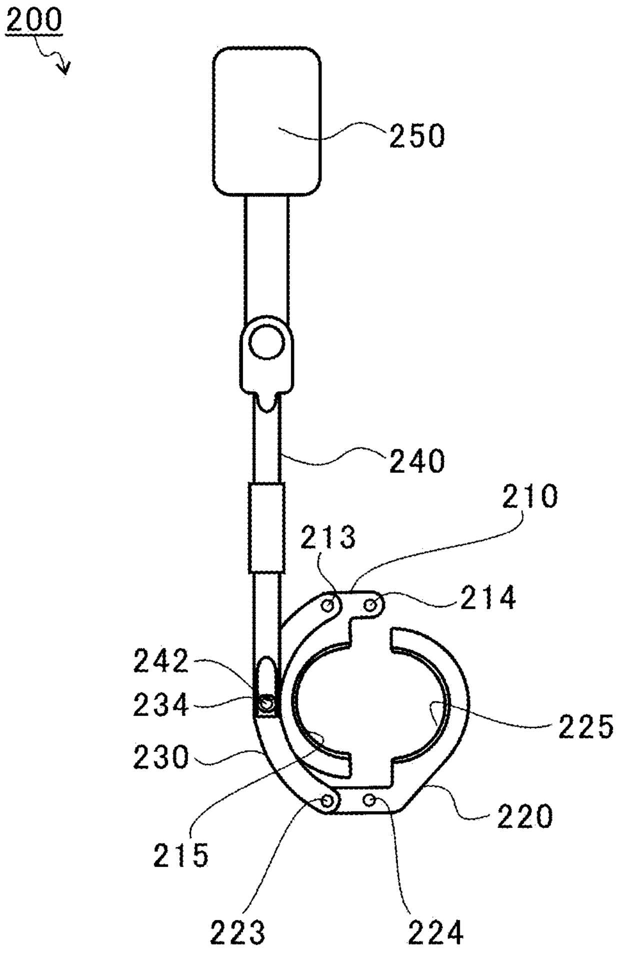
FIG. 6 is a second diagram for explaining the operation of the link mechanism.
Figure 7:
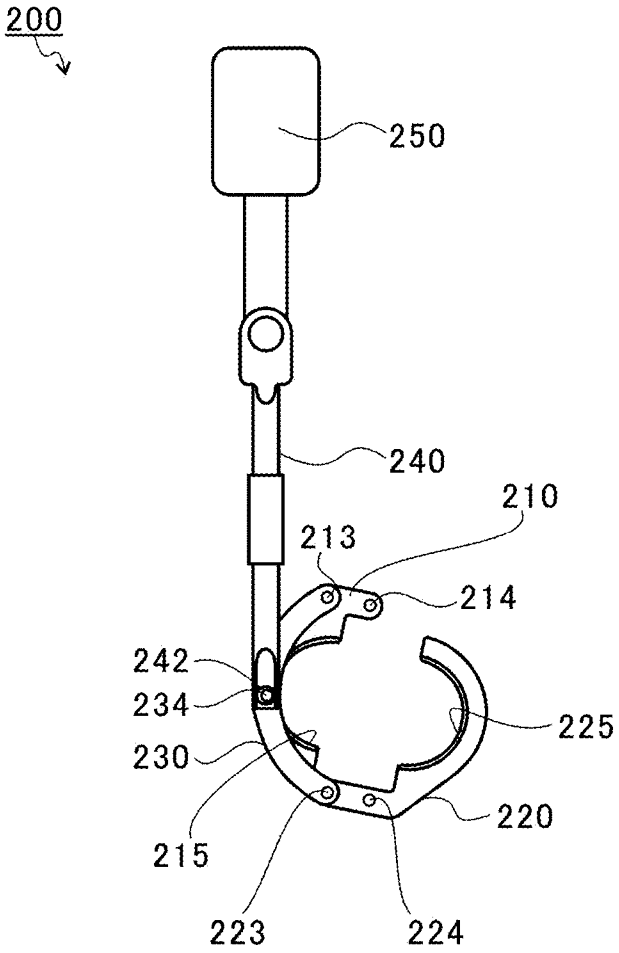
FIG. 7 is a third diagram for explaining the operation of the link mechanism.

FIG. 6 is a second diagram for explaining the operation of the link mechanism 200. FIG. 7 is a third diagram for explaining the operation of the link mechanism 200. The actuator 250 causes the rod 240 to linearly move in a direction intersecting with the rotation axis direction (up-down direction in FIGS. 6 and 7). In FIGS. 6 and 7, the rod 240 moves upward from the position illustrated in FIG. 5. The arrangement of FIG. 7 has a larger amount of movement of the rod 240 than that of the arrangement of FIG. 6 with respect to that of the arrangement of FIG. 5.

When the rod 240 moves, the coupling member 230 also moves upward in FIGS. 6 and 7 via the rod connection portion 234. At this point, the coupling member 230 is allowed to rotate about the rod connection portion 234 as the rotation center. There is a slight play in the inner diameter of the bearing hole 242 of the rod 240 with respect to the outer diameter of the rod connection portion 234. Therefore, the coupling member 230 is allowed to slightly move in the planar direction orthogonal to the rotation axis direction.

As described above, the link mechanism 200 has four links. The coupling member 230, the first movable member 210, and the second movable member 220 behave in one-degree-of-freedom with respect to the first housing member 110. Specifically, the coupling member 230 slightly swings in the left-right direction while slightly rotating counter-clockwise in FIGS. 6 and 7 within the above allowable range.

The rotation shaft 214 of the first movable member 210 is pivotally supported by the first housing member 110. The movement of the rotation shaft 214 in the planar direction orthogonal to the rotation axis direction is restricted. The coupling shaft 213 is pivotally supported by the coupling member 230. Since the movement of the coupling member 230 is allowed, the coupling shaft 213 is movable in the planar direction orthogonal to the rotation axis direction. As a result, with the movement of the coupling member 230, the first movable member 210 rotates clockwise about the rotation shaft 214 as the rotation center in FIGS. 6 and 7.

Similarly, the rotation shaft 224 of the second movable member 220 is pivotally supported by the first housing member 110. The movement of the rotation shaft 224 in the planar direction orthogonal to the rotation axis direction is restricted. The coupling shaft 223 is pivotally supported by the coupling member 230. Since the movement of the coupling member 230 is allowed, the coupling shaft 223 is movable in the planar direction orthogonal to the rotation axis direction. As a result, with the movement of the coupling member 230, the second movable member 220 rotates clockwise about the rotation shaft 224 as the rotation center in FIGS. 6 and 7.

The first movable member 210 and the second movable member 220 move in a direction of separating from each other in the order from FIGS. 6 to 7. The protruding portions 215 and 225 move outward in the radial direction with respect to the protruding position. The position of the first movable member 210 and the second movable member 220 in this state (specifically, the state illustrated in FIG. 7) is referred to as a retracted position. In the retracted position, for example, the protruding portions 215 and 225 are flush with the inner wall surface of the intake flow path 130 or are positioned on an outer side in the radial direction with respect to the inner wall surface of the intake flow path 130. At the retracted position, the first movable member 210 and the second movable member 220 are retracted from the intake flow path 130. Upon shift from the retracted position to the protruding position, the first movable member 210 and the second movable member 220 approach and abut against each other in the order of FIGS. 7, 6, and 5. As described above, the positions of the first movable member 210 and the second movable member 220 are switched between the protruding position and the retracted position depending on the rotation angles about the rotation shafts 214 and 224 as the rotation centers.

As described above, the first movable member 210 and the second movable member 220 are provided on the intake port 10 side with respect to the compressor impeller 9 in the intake flow path 130. The first movable member 210 and the second movable member 220 are provided in such a manner as to cover the intake flow path 130. The first movable member 210 and the second movable member 220 are movable to the protruding position protruding into the intake flow path 130 and the retracted position retracting from the intake flow path 130. In the present embodiment, the first movable member 210 and the second movable member 220 move in the radial direction of the compressor impeller 9. Incidentally, without being limited thereto, the first movable member 210 and the second movable member 220 may rotate around the rotation axis of the compressor impeller 9. For example, the first movable member 210 and the second movable member 220 may be shutter blades having two or more blades.

Since the first movable member 210 and the second movable member 220 do not protrude into the intake flow path 130 when located at the retracted position, the pressure loss of the air flowing through the intake flow path 130 can be reduced.

As illustrated in FIG. 2, in the first movable member 210 and the second movable member 220, the protruding portions 215 and 225 are disposed in the intake flow path 130 at the protruding position. When the first movable member 210 and the second movable member 220 are located at the protruding position, the flow path cross-sectional area of the intake flow path 130 decreases.

In the centrifugal compressor CC, as the flow rate of the air flowing into the compressor impeller 9 decreases, the air compressed by the compressor impeller 9 may flow backward through the intake flow path 130. That is, the air compressed by the compressor impeller 9 may flow from the downstream side toward the upstream side.

As illustrated in FIG. 2, when the first movable member 210 and the second movable member 220 are located at the protruding position, the protruding portions 215 and 225 are located on the inner side in the radial direction with respect the radially outermost end of the leading edges LE of the compressor impeller 9. As a result, the air flowing backward in the intake flow path 130 is blocked by the protruding portions 215 and 225. Therefore, the first movable member 210 and the second movable member 220 can suppress the backflow of the air in the intake flow path 130.

In addition, since the flow path cross-sectional area of the intake flow path 130 decreases, the flow rate of the air flowing into the compressor impeller 9 increases. As a result, it is possible to suppress occurrence of surging in the centrifugal compressor CC. That is, the centrifugal compressor CC of the present embodiment can expand the operating region of the centrifugal compressor CC to a small-flow-rate side by forming the protruding position state.

As described above, the first movable member 210 and the second movable member 220 are configured as a throttle member that throttles the intake flow path 130. That is, in the present embodiment, the link mechanism 200 functions as a throttle mechanism for throttling the intake flow path 130. The first movable member 210 and the second movable member 220 can change the flow path cross-sectional area of the intake flow path 130 with the link mechanism 200 driven.

In the centrifugal compressor CC, in a case where a strong backflow of air occurs in the intake flow path 130, the backflow of air may not be sufficiently blocked by the first movable member 210 and the second movable member 220 which are movable members. In this case, the efficiency of the centrifugal compressor CC decreases. In the present embodiment, devising the shape of the movable members achieves effectively suppressing the backflow of air and effectively suppressing the decrease in the efficiency of the centrifugal compressor CC.

Figure 8:
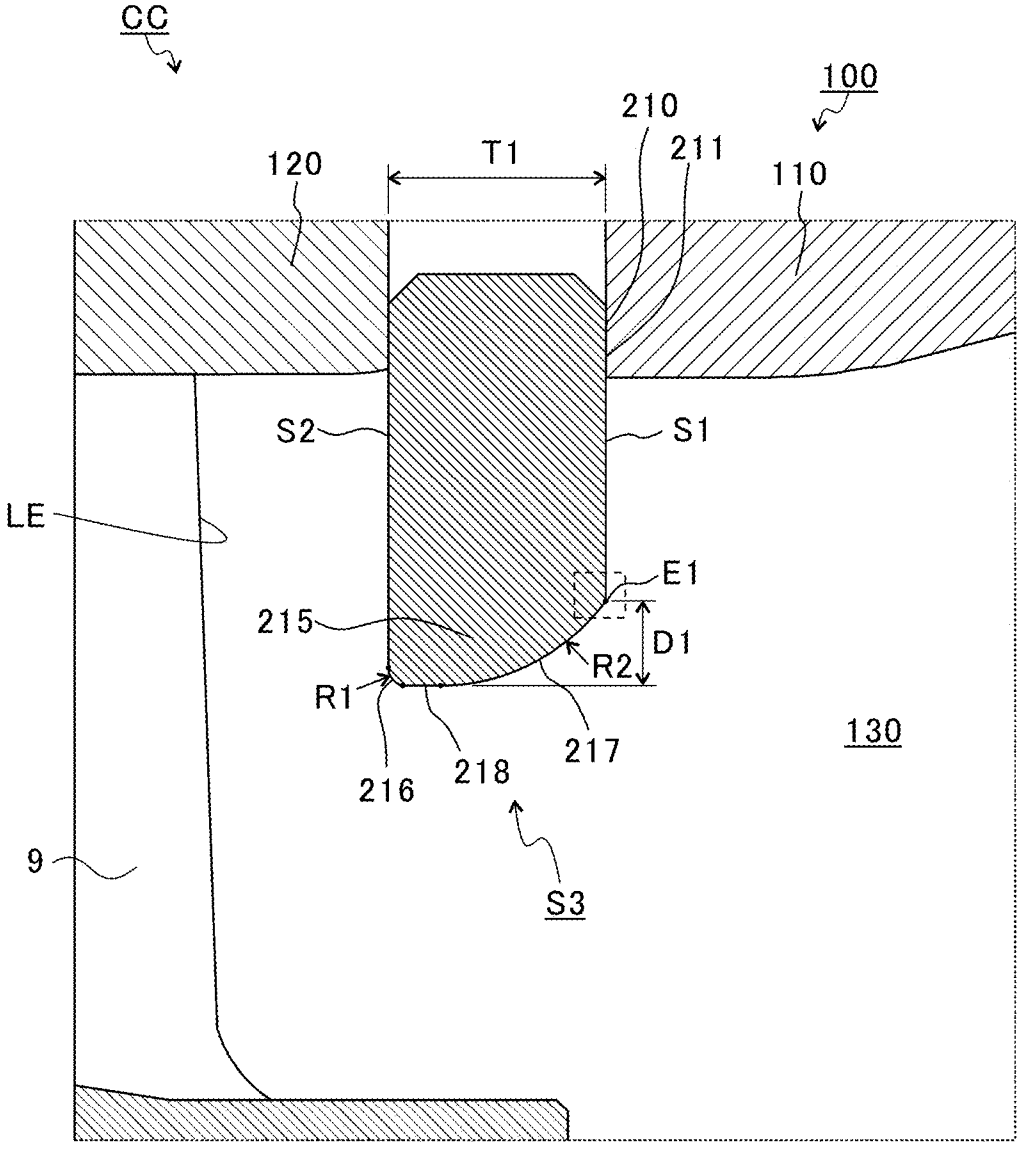
FIG. 8 is a schematic cross-sectional view illustrating details of a shape of a movable member.
Figure 9:
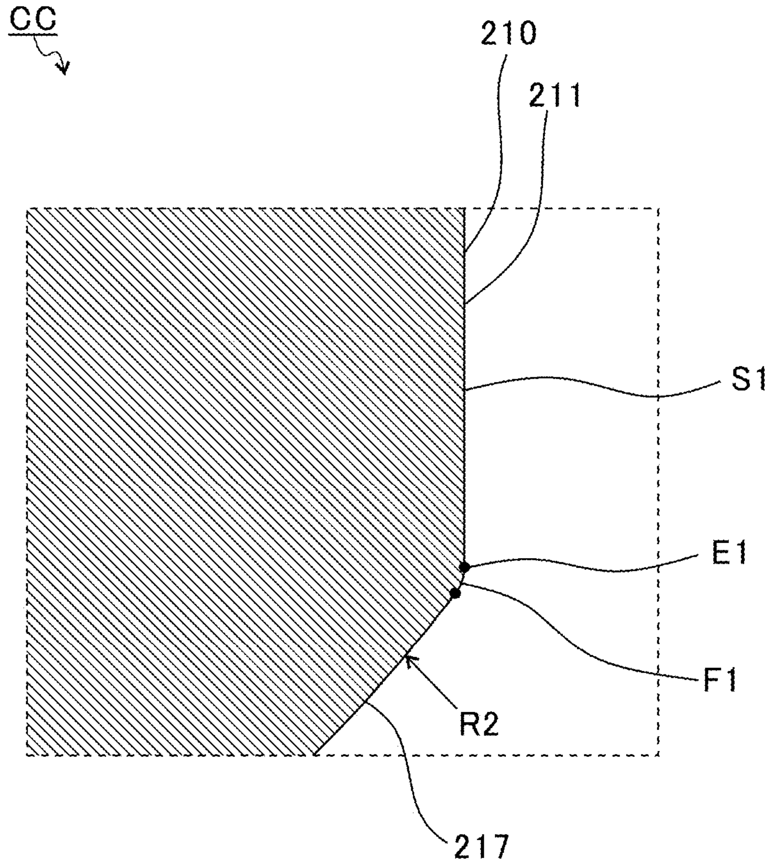
FIG. 9 is a diagram of a broken line part extracted from FIG. 8.
Figure 10:
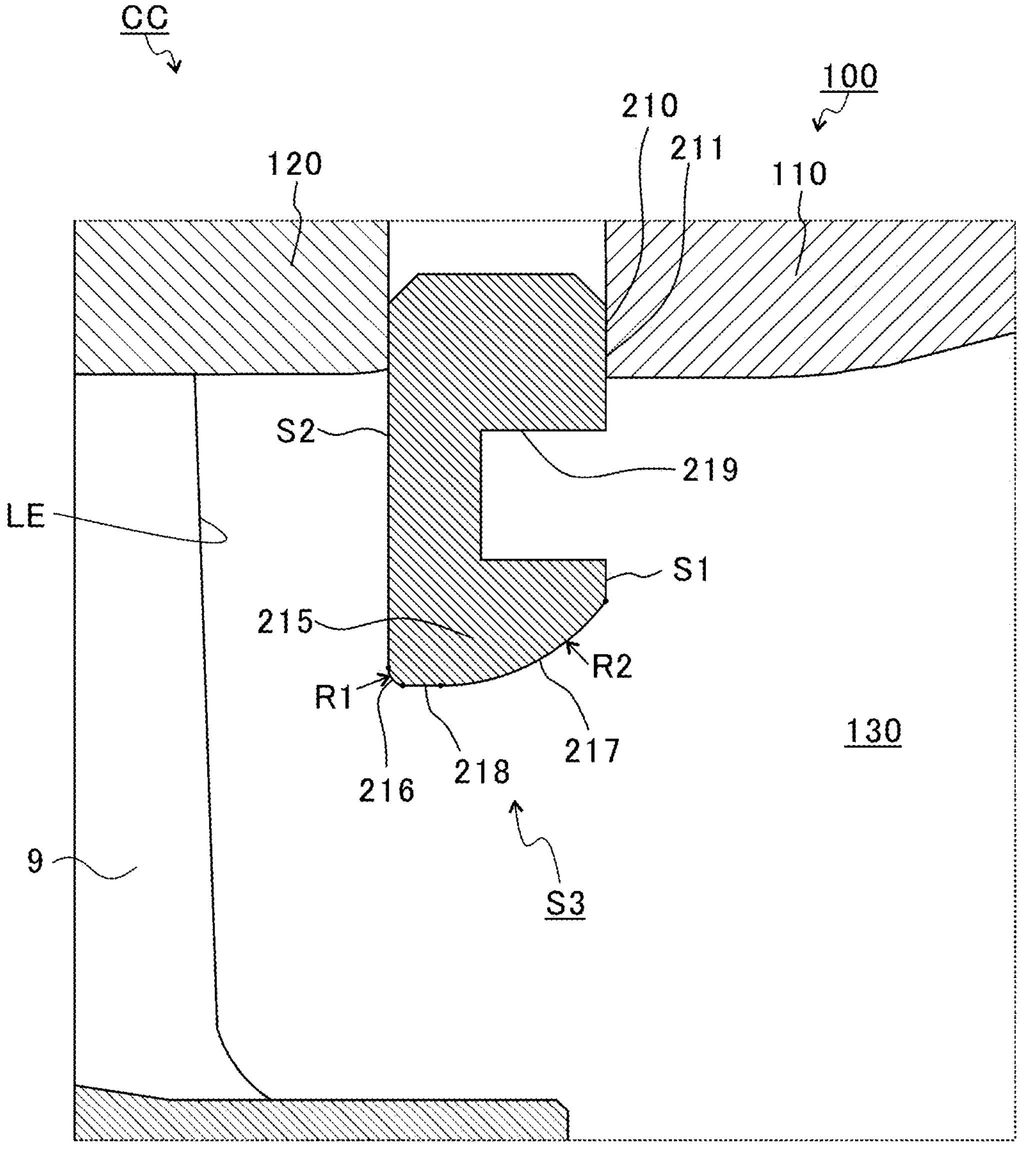
FIG. 10 is a schematic cross-sectional view illustrating the shape of a movable member according to a modification.

Hereinafter, details of the shape of the movable members for more effectively suppressing the backflow of air will be described with reference to FIGS. 8 to 10. In FIGS. 8 to 10, only the first movable member 210 is illustrated as the movable member. Specifically, FIGS. 8 to 10 illustrate a cross section taken along the rotation axis of the compressor impeller 9 and passing through the curved portion 211 of the first movable member 210. Note that the shape of the second movable member 220 is similar to the shape of the first movable member 210, and thus the description thereof will be omitted.

FIG. 8 is a schematic cross-sectional view illustrating details of the shape of the movable member. As illustrated in FIG. 8, a first end 216, a second end 217, and an extending portion 218 are formed on an inner curved surface S3 of the first movable member 210. The inner curved surface S3 is a surface between the facing surface S1 and the facing surface S2 among the surfaces of the protruding portion 215. The inner curved surface S3 connects the facing surface S1 and the facing surface S2. The facing surface S1 and the facing surface S2 extend in a direction orthogonal to the rotation axis of the compressor impeller 9.

The first end 216 is an end on the compressor impeller 9 side (left side in FIG. 8) of the inner curved surface S3. The first end 216 is on the compressor impeller 9 side with respect to the second end 217 on the inner curved surface S3. The first end 216 has an annular shape centered on the rotation axis of the compressor impeller 9. The first end 216 has a first curvature radius R1. The first end 216 has an arc shape having a curvature radius of the first curvature radius R1 in a cross section taken along the rotation axis of the compressor impeller 9. The first end 216 corresponds to a first R portion which is an R portion formed on the compressor impeller 9 side of the inner curved surface S3. The R portion is a portion having an arc shape in a cross section taken along the rotation axis of the compressor impeller 9.

The second end 217 is an end of the inner curved surface S3 on the intake port 10 side (the right side in FIG. 8). The second end 217 is on the intake port 10 side with respect to the first end 216 on the inner curved surface S3. The second end 217 has an annular shape centered on the rotation axis of the compressor impeller 9. The second end 217 has a second curvature radius R2. The second curvature radius R2 is larger than the first curvature radius R1. In particular, in the example of FIG. 8, the second curvature radius R2 is larger than a thickness T1 of the first movable member 210 in the rotation axis direction. The second end 217 has an arc shape having a curvature radius of the second curvature radius R2 in a cross section taken along the rotation axis of the compressor impeller 9. The second end 217 corresponds to a second R portion which is an R portion formed on the intake port 10 side of the inner curved surface S3.

The extending portion 218 is included between the first end 216 and the second end 217. That is, the first end 216 and the second end 217 are connected by the extending portion 218. The extending portion 218 has an annular shape centered on the rotation axis of the compressor impeller 9. The extending portion 218 extends in a direction corresponding to the rotation axis direction of the compressor impeller 9. In the example of FIG. 8, the extending direction of the extending portion 218 is the same direction as the rotation axis direction of the compressor impeller 9. Note that the extending direction of the extending portion 218 may be inclined to some extent with respect to the rotation axis direction of the compressor impeller 9. Also in this case, the extending direction of the extending portion 218 may correspond to the rotation axis direction of the compressor impeller 9. The extending portion 218 has a linear shape extending in a direction corresponding to the rotation axis direction of the compressor impeller 9 in a cross section taken along the rotation axis of the compressor impeller 9.

The first end 216 connects the facing surface S2 and the extending portion 218. In the example of FIG. 8, the tangential direction of the first end 216 coincides with the extending direction of the facing surface S2 at the connection position between the first end 216 and the facing surface S2. However, at the connection position between the first end 216 and the facing surface S2, the tangential direction of the first end 216 may be different to some extent from the extending direction of the facing surface S2.

In the example of FIG. 8, the tangential direction of the first end 216 coincides with the extending direction of the extending portion 218 at the connection position between the first end 216 and the extending portion 218. However, at the connection position between the first end 216 and the extending portion 218, the tangential direction of the first end 216 may be different to some extent from the extending direction of the extending portion 218.

The second end 217 connects the facing surface S1 and the extending portion 218. In the example of FIG. 8, the tangential direction of the second end 217 and the extending direction of the facing surface S1 are different at the connection position between the second end 217 and the facing surface S1. FIG. 9 is a diagram of a broken line part extracted from FIG. 8. As illustrated in FIG. 9, a fillet portion F1 having a minute curvature radius is formed between the second end 217 and the facing surface S1. The curvature radius of the fillet portion F1 may, for example, coincide with the first curvature radius R1 or may be smaller than the first curvature radius R1.

At the connection position between the second end 217 and the fillet portion F1, the tangential direction of the second end 217 coincides with the tangential direction of the fillet portion F1. However, at the connection position between the second end 217 and the fillet portion F1, the tangential direction of the second end 217 may be different to some extent from the tangential direction of the fillet portion F1. At the connection position between the fillet portion F1 and the facing surface S1, the tangential direction of the fillet portion F1 coincides with the extending direction of the facing surface S1. However, at the connection position between the fillet portion F1 and the facing surface S1, the tangential direction of the fillet portion F1 may be different to some extent from the extending direction of the facing surface S1. The fillet portion F1 may not be formed between the second end 217 and the facing surface S1.

In the example of FIG. 8, the tangential direction of the second end 217 coincides with the extending direction of the extending portion 218 at the connection position between the second end 217 and the extending portion 218. However, at the connection position between the second end 217 and the extending portion 218, the tangential direction of the second end 217 may be different to some extent from the extending direction of the extending portion 218.

As described above, the centrifugal compressor CC includes the first end 216 that is the end on the compressor impeller 9 side on the inner curved surface S3 of the movable member (in the above example, the first movable member 210), the second end 217 that is the end on the intake port 10 side of the inner curved surface S3 of the movable member, and the extending portion 218 included between the first end 216 and the second end 217 and extending in the direction corresponding to the rotation axis direction of the compressor impeller 9.

With the extending portion 218 included between the first end 216 and the second end 217, the flowing direction of the air flowing from the intake port 10 toward the compressor impeller 9 can be guided in the rotation axis direction of the compressor impeller 9. As a result, the flow direction of the air flowing from the intake port 10 toward the compressor impeller 9 can be suppressed from being excessively inclined radially inward as the air approaches the compressor impeller 9. When the flowing direction of the air flowing from the intake port 10 toward the compressor impeller 9 is inclined as described above, a backflow region of the air on the compressor impeller 9 side with respect to the movable members (namely, a region where a backflow of air is occurring) tends to expand radially inward. Therefore, by guiding the flowing direction of the air flowing from the intake port 10 toward the compressor impeller 9 in the rotation axis direction of the compressor impeller 9, the backflow region of the air on the compressor impeller 9 side with respect to the movable members can be suppressed from expanding radially inward. Therefore, even in a case where a strong backflow of air occurs in the intake flow path 130, the backflow of air can be sufficiently blocked by the movable members, and the backflow of air can be effectively suppressed. Therefore, it is achieved to effectively suppress a decrease in efficiency of the centrifugal compressor CC.

In particular, in the centrifugal compressor CC, the second curvature radius R2, which is the curvature radius of the second end 217, is larger than the first curvature radius R1, which is the curvature radius of the first end 216.

By reducing the first curvature radius R1 of the first end 216, it is possible to suppress the air flowing backward from the compressor impeller 9 toward the movable members from flowing backward to the upstream side along the first end 216. That is, the air flowing backward from the compressor impeller 9 toward the movable members can be effectively blocked by the facing surface S2. From the viewpoint of effectively blocking the backward-flowing air by the facing surface S2, the first curvature radius R1 of the first end 216 is preferably as small as possible. For example, the first curvature radius R1 is preferably less than or equal to 1 mm and, more preferably, less than or equal to 0.1 mm. The first curvature radius R1 may be 0 mm.

By increasing the second curvature radius R2 of the second end 217, the air flowing from the intake port 10 toward the compressor impeller 9 easily flows along the second end 217. As a result, separation of the air at the second end 217 is suppressed, and thus the position on the inner curved surface S3 of the movable member at which the air is separated can be set on a further downstream side. When the air is separated on an upstream side on the inner curved surface S3 of the movable member, the backflow region of the air on the compressor impeller 9 side with respect to the movable member tends to expand radially inward. Therefore, by setting the position where the air is separated on the inner curved surface S3 of the movable member to the further downstream side, it is possible to suppress radially inward expansion of the backflow region of the air on the compressor impeller 9 side with respect to the movable member.

As described above, since the second curvature radius R2, which is the curvature radius of the second end 217, is larger than the first curvature radius R1, which is the curvature radius of the first end 216, the backflow of air can be sufficiently blocked by the movable members, and the backflow of air can be more effectively suppressed. Therefore, it is possible to more effectively suppress a decrease in efficiency of the centrifugal compressor CC.

In particular, in the centrifugal compressor CC, the second curvature radius R2, which is the curvature radius of the second end 217, is larger than the thickness T1 of the movable member (in the above example, the first movable member 210) in the rotation axis direction. As a result, the air flowing from the intake port 10 toward the compressor impeller 9 further easily follows along the second end 217. Therefore, since separation of the air at the second end 217 is further suppressed, the position on the inner curved surface S3 of the movable member at which the air is separated can be set on the further downstream side. Therefore, the backflow region of the air on the compressor impeller 9 side with respect to the movable member can be further suppressed from expanding radially inward.

In particular, in the centrifugal compressor CC, a fillet portion F1 is formed between the second end 217 and a surface of the movable member (in the above example, the first movable member 210) facing the intake port 10 (in the above example, the facing surface S1). As a result, as compared with the case where the fillet portion F1 is not formed, separation of the air at the connection position between the second end 217 and the facing surface S1 is suppressed. Therefore, it is appropriately implemented that the position, where the air is separated on the inner curved surface S3 of the movable member, be set on a downstream side. Therefore, it is appropriately implemented that the backflow region of the air on the compressor impeller 9 side with respect to the movable member be suppressed from expanding radially inward.

In particular, in the centrifugal compressor CC, a radial distance D1 between an inner circumferential edge E1 of the surface of the movable member (in the above example, the first movable member 210) facing the intake port 10 side (in the above example, the facing surface S1) and the extending portion 218 is less than or equal to an upper limit value corresponding to the thickness T1 of the movable member in the rotation axis direction and is greater than or equal to a lower limit value corresponding to the thickness T1 of the movable member in the rotation axis direction. However, only the upper limit value or only the lower limit value may be set for the radial distance D1.

In a case where the radial distance D1 is excessively long, it becomes difficult to guide the flow direction of the air flowing from the intake port 10 toward the compressor impeller 9 in the rotation axis direction of the compressor impeller 9. Therefore, the upper limit value of the radial distance D1 is set as appropriate from the viewpoint of implementing that the flow direction of the air flowing from the intake port 10 toward the compressor impeller 9 be guided in the rotation axis direction of the compressor impeller 9. For example, the upper limit value of the radial distance D1 may be set to 80% of the thickness T1. By setting the radial distance D1 to less than or equal to the upper limit value (for example, less than or equal to 80% of the thickness T1), it is appropriately implemented that the flow direction of the air flowing from the intake port 10 toward the compressor impeller 9 be guided in the rotation axis direction of the compressor impeller 9.

In a case where the radial distance D1 is excessively short, the air is easily separated on the upstream side of the inner curved surface S3 of the movable member. Therefore, the lower limit value of the radial distance D1 is set as appropriate from the viewpoint of implementing that the position at which the air is separated on the inner curved surface S3 of the movable member be set on the further downstream side. For example, the lower limit value of the radial distance D1 can be set to 20% of the thickness T1. By setting the radial distance D1 to greater than or equal to the lower limit value (for example, greater than or equal to 20% of the thickness T1), it is appropriately implemented that the position where the air is separated on the inner curved surface S3 of the movable member be set on the further downstream side.

FIG. 10 is a schematic cross-sectional view illustrating the shape of a movable member according to a modification. The modification illustrated in FIG. 10 is different from the example of FIG. 8 described above in that a groove 219 is added. As illustrated in FIG. 10, in the modification, the groove 219 is included on a facing surface S1 of a first movable member 210. The groove 219 is recessed from the facing surface S1 toward a facing surface S2. For example, the groove 219 is formed to extend in the circumferential direction in a curved portion 211. With the groove 219 formed in the movable member (for example, the first movable member 210), deformation due to thermal contraction when the movable member is molded by injection molding is suppressed.

In particular, in the modification illustrated in FIG. 10, similarly to the example of FIG. 8 described above, a second curvature radius R2 is greater than a thickness T1 of the movable member (in the above example, the first movable member 210) in the rotation axis direction. Therefore, the second curvature radius R2 of a second end 217 can be easily increased. As a result, as compared with a case where the second curvature radius R2 is smaller than the thickness T1, it is easier to bring an inner curved surface S3 of the movable member generally close to the groove 219 and to generally reduce the radial distance between the inner curved surface S3 of the movable member and the groove 219. Therefore, deformation due to thermal contraction when the movable member is molded by injection molding is more effectively suppressed.

Although the embodiments of the present disclosure have been described with reference to the accompanying drawings, it is naturally understood that the present disclosure is not limited to the above embodiments. It is clear that those skilled in the art can conceive various modifications or variations within the scope described in the claims, and it is understood that they are naturally also within the technical scope of the present disclosure.

The invention claimed is:

1. A centrifugal compressor comprising:
an intake flow path connected to an intake port;
a compressor impeller disposed in the intake flow path;
a movable member provided on an intake port side with respect to the compressor impeller in the intake flow path, the movable member movable to a protruding position protruding into the intake flow path and a retracted position retracting from the intake flow path; the movable member comprising:
a first portion that is a portion having an arc shape in a cross section taken along a rotation axis of the compressor impeller, provided on a compressor impeller side, of an inner curved surface of the movable member,
a second portion that is a portion having an arc shape in a cross section taken along the rotation axis of the compressor impeller, provided on the intake port side, of the inner curved surface of the movable member;
an extending portion between the first portion and the second portion, of the inner curved surface of the movable member, the extending portion extending in a direction corresponding to a rotation axis direction of the compressor impeller; and
a groove extending in a circumferential direction of the compressor impeller is included on a surface of the movable member facing the intake port side,
wherein a connection position between the second portion and the extending portion is located on the compressor impeller side with respect to a center of the movable member in the rotation axis direction, and
wherein a curvature radius of the second portion is larger than a thickness of the movable member in the rotation axis direction.

2. The centrifugal compressor according to claim 1, wherein the curvature radius of the second portion is larger than a curvature radius of the first portion.

3. The centrifugal compressor according to claim 1, wherein a fillet portion is formed between the second portion and a surface of the movable member facing the intake port side.

4. The centrifugal compressor according to claim 2, wherein a radial distance between an inner circumferential edge of a surface of the movable member facing the intake port side and the extending portion is less than or equal to 80% of a thickness of the movable member in the rotation axis direction.

5. The centrifugal compressor according to claim 1, wherein a radial distance between an inner circumferential edge of a surface of the movable member facing the intake port side and the extending portion is less than or equal to 80% of a thickness of the movable member in the rotation axis direction.

6. The centrifugal compressor according to claim 3, wherein a radial distance between an inner circumferential edge of a surface of the movable member facing the intake port side and the extending portion is less than or equal to 80% of a thickness of the movable member in the rotation axis direction.

7. The centrifugal compressor according to claim 2, wherein a radial distance between an inner circumferential edge of a surface of the movable member facing the intake port side and the extending portion is greater than or equal to 20% of a thickness of the movable member in the rotation axis direction.

8. The centrifugal compressor according to claim 1, wherein a radial distance between an inner circumferential edge of a surface of the movable member facing the intake port side and the extending portion is greater than or equal to 20% of a thickness of the movable member in the rotation axis direction.

9. The centrifugal compressor according to claim 3, wherein a radial distance between an inner circumferential edge of a surface of the movable member facing the intake port side and the extending portion is greater than or equal to 20% of a thickness of the movable member in the rotation axis direction.

10. The centrifugal compressor according to claim 1, wherein the groove is recessed from the surface of the movable member facing the intake port side toward a surface of the movable member toward the compressor impeller side.

11. The centrifugal compressor according to claim 10, wherein the groove is recessed adjacent to an end of the second portion.

12. The centrifugal compressor according to claim 10, wherein the groove has a rectangular cross-section.

* * * * *